Dec. 1, 1931.  J. J. BURK  1,834,826
MAIL CONVEYER
Filed Jan. 29, 1930
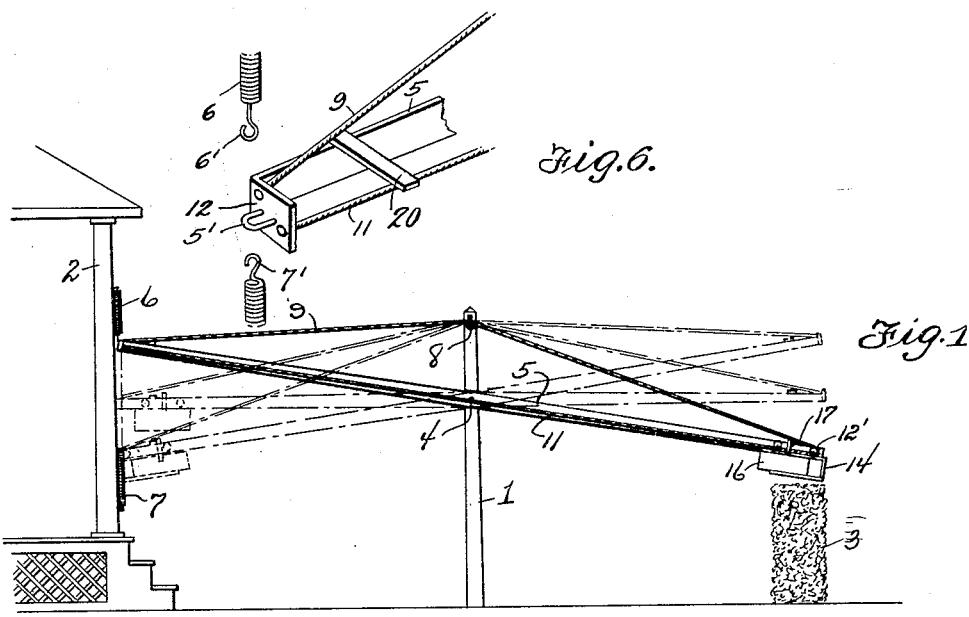
Fig.6.
Fig.1.
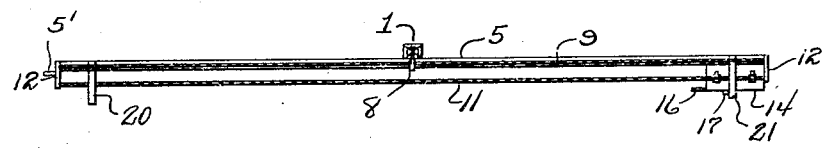
Fig.2.
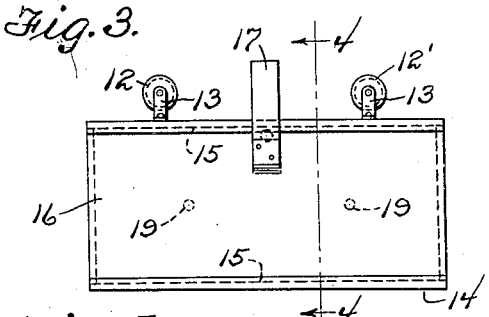
Fig.3.
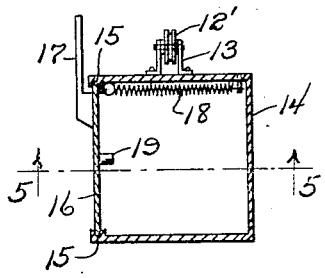
Fig.4.
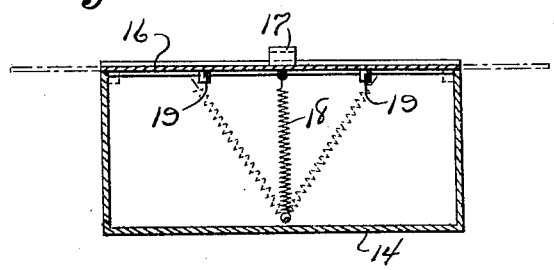
Fig.5.
Jarvey J. Burk
INVENTOR
BY Victor J. Evans
ATTORNEY Patented Dec. 1, 1931

1,834,826

UNITED STATES PATENT OFFICE

JARVEY J. BURK, OF ETTY, KENTUCKY

MAIL CONVEYER

Application filed January 29, 1930. Serial No. 424,399.

The object of this, my present invention, is the provision of means whereby mail matter may be delivered from the doorway of a house or porch to the lawn or sidewalk and received therefrom without the necessity of the occupant of the dwelling traveling such distance or the necessity of the mailman traveling from the sidewalk to the house, and the primary object of the invention is the provision of a means for this purpose which shall be of a simple construction, cheaply manufactured, easily erected, readily operated and wherein the mail box is of a particular and peculiar construction.

A further object is the provision of means for automatically opening the box when the same has traveled to each of its stopping points.

To the attainment of the foregoing the invention consists in the improvement hereinafter described and definitely claimed.

In the drawings:

Figure 1 is a side elevation of the improvement, the dotted lines illustrating the device in normal position, that is when mail is to be delivered into the box from the house.

Figure 2 is a top plan view thereof.

Figure 3 is a side elevation of the mail box.

Figure 4 is a sectional view on the line 4—4 of Figure 3.

Figure 5 is a horizontal sectional view approximately on the line 5—5 of Figure 4.

Figure 6 is a fragmentary perspective view to illustrate the relation of the springs to the inner end of the tiltable bar.

In the showing of the drawings I have illustrated my improvement arranged between the porch of a house and the hedge or outer fence therefor.

In carrying out my invention I erect a post 1 between a porch or dwelling 2 and a fence or hedge 3. On this post 1 I pivotally secure, as at 4, a rod or bar 5. The bar or rod is preferably of metal and while light in construction, is of a length to span the space between the dwelling 2 and the hedge or fence 3. Also preferably the bar 5 is treated to prevent the corrosion thereof.

The bar 5 has its ends extended in the same angular direction as indicated by the numerals 12—12. To the inner angle end 12 there is secured an eye or like element 5'. Having their opposite ends secured to the porch or dwelling 2 there are upper and lower coil springs 6 and 7, respectively. The confronting ends of these spaced springs are provided with hooks 6' and 7', respectively. The hook 6' of the upper spring 6 is designed to be brought to engage with the eye or like element 5' when the bar 5 is swung to the angular position disclosed by the full lines in Figure 1 of the drawings. The hooks of both of the springs 6 and 7 are brought to engage with the eye 5' when the bar 5 is in the horizontal position as disclosed by the central dotted lines in Figure 1 of the drawings, while the hook 6' of the spring 6 is released and the hook 7' of the spring 7 is brought to engage with the eye 5' when the bar is to be tilted to bring its inner end downward with respect to the porch, as also disclosed by the dotted lines in said Figure 1. To the angle or flanged ends 12 of the bar 5 and adjacent to the lower corners thereof there are secured the ends of a cable 11, while also secured to the said angle portions 12, adjacent to the inner corners thereof, there are the ends of another cable 9. The cable 9 is trained over a sheave wheel 8 that is supported adjacent to the top of the post 1. The cable 11 is in the nature of a track on which a mail box is designed to travel. The mail box is indicated by the numeral 14 in the drawings and has on its top, adjacent its ends, spaced brackets 13 having bearing openings for the trunnions of grooved wheels 12' which are arranged between the spaced brackets and these grooved wheels 12' travel on the track 11.

The mail box is preferably of a rectangular formation and has one of its sides open but provided with guideways 15 for a slidable door 16. The door is provided with an outer operating handle 17. The door has centrally secured thereto one end of a coil spring 18, the second end of the said spring being fixedly secured to what I will term the inner face of the mail box 14. The spring is in the nature of an equalizing member and normally holds the door closed but by reference to the dotted lines in Figure 5 of the drawings it will be noted when the handle element 17 is operated the door is slid to open either end of the box and the outward or open movement of the door is limited by stop elements 19 which are fixed to the door and are designed to contact with either of the ends of the box.

As previously stated the spring 6 holds the bar 5 at a downward inclination and the spring 7 holds the bar at an upward inclination. Obviously when the bar is arranged at a downward angle the box 14 will move over the track 11 toward the hedge or fence 3 and the outward movement of the said box is limited by the contact with the outer flange 12 of the bar. In a like manner the downward swinging of the bar from the porch or dwelling 2 will cause the box to travel toward the porch or dwelling and in the first instance the mailman can readily receive mail from the box and in the other instance the housewife can likewise receive mail delivered into the box.

On the bar 5, at suitable points inward of the stop flanges 12 there are arranged laterally extending fingers 20 and 21, respectively. These pins extend in the same direction as the flanges 12 and the said fingers 20 are designed to contact with the handle element 17 to automatically move the door 16 to open position when the bar 5 has been tilted to cause the mail box to travel to either of its stopping points and whereby mail can be readily placed in or removed from the box without necessitating the manual operation of the handle 17.

Having described the invention, I claim:

1. A vertical post erected between a dwelling and a fence therefor, a bar of a length equalling the distance between the dwelling and fence centrally pivoted to the post, a track on the bar, a mail box movable on the track and means on the dwelling to engage with the bar for holding the outer end of the bar at either an upward or downward inclination.

2. A vertical post erected between a dwelling and a fence therefor, a bar of a length equalling the distance between the dwelling and fence centrally pivoted to the post, a track on the bar, a mail box movable on the track and spring means on the dwelling to engage with the bar for holding the outer end of the bar in either an upward or a downward inclination.

3. A vertical post erected between a dwelling and a fence therefor, a bar of a length equalling the distance between the dwelling and fence centrally pivoted to the post, a track on the bar, a mail box movable on the track and spring means on the dwelling to engage with the bar for holding the outer end of the bar in either an upward or a downward inclination and a flexible truss brace fixed to the ends of the bar and yieldably supported by the post.

4. A vertical post erected between a dwelling and a fence therefor, a bar of a length equalling the distance between the dwelling and fence centrally pivoted to the post, a track on the bar, a mail box movable on the track and spring means on the dwelling to engage with the bar for holding the outer end of the bar in either an upward or a downward inclination and a flexible truss brace fixed to the ends of the bar and yieldably supported by the post, and means for limiting both the inward and outward movement of the box.

5. A vertical post erected between a dwelling and a fence therefor, a bar of a length equalling the distance between the dwelling and fence centrally pivoted to the post, a track on the bar, a mail box movable on the track and spring means on the dwelling to engage with the bar for holding the outer end of the bar in either an upward or a downward inclination, and means for automatically opening the box when the same has traveled to each of its stopping points.

6. A tiltable track, a mail box arranged to travel on the track, stop means to engage with the mail box at the end of the track, a slidable door for the mail box spring influenced to closed position, a handle on the door, and elements inward of the stops for engaging the handle to move the door to open position when the box has traveled to either of its stopping points.

In testimony whereof I affix my signature.

JARVEY J. BURK.